Aug. 28, 1951  H. CASTEL ET AL  2,565,472
MEASURING INSTRUMENT USING PRESSURE SENSITIVE CHAMBER
Filed July 15, 1947  3 Sheets-Sheet 1

INVENTORS.
HENRI CASTEL
CHARLES PICARDEL
BY
ATTORNEY.

Aug. 28, 1951    H. CASTEL ET AL    2,565,472
MEASURING INSTRUMENT USING PRESSURE SENSITIVE CHAMBER
Filed July 15, 1947    3 Sheets-Sheet 2

INVENTORS
HENRI CASTEL
CHARLES PICARDEL
BY
*Robert Harding Jr.*
ATTORNEY.

Aug. 28, 1951  H. CASTEL ET AL  2,565,472
MEASURING INSTRUMENT USING PRESSURE SENSITIVE CHAMBER
Filed July 15, 1947  3 Sheets-Sheet 3

INVENTORS
HENRI CASTEL
CHARLES PICARDEL.
BY
*Robert Harding Jr.*
ATTORNEY.

Patented Aug. 28, 1951

2,565,472

UNITED STATES PATENT OFFICE 2,565,472

MEASURING INSTRUMENT USING PRESSURE SENSITIVE CHAMBER

Henri Castel and Charles Picardel, Boulogne Billancourt, France, assignors to International Standard Electric Corp., New York, N. Y., a corporation of Delaware Application July 15, 1947, Serial No. 760,966
In France October 18, 1944

Section 1, Public Law 690, August 8, 1946
Patent expires October 18, 1964

14 Claims. (Cl. 73—397)

This invention relates to measuring instruments making use of pressure sensitive elements or chambers capable of giving, on a single dial, the readings that would normally require several instruments of the same type. It finds an application, in particular but not exclusively, in such instruments as used on board aircraft to check on useful data pertaining to the flight, in which case it simplifies the instrument panel and facilitates the reading of said data.

A detailed discussion of the invention, as applied to a combined or combination instrument enabling the pilot to obtain the speed of the ship (whether it be cruising or landing speed) by direct reading of a single dial provided with two pointers, will be given below. To such an end, the invention provides for adapting to these instruments a pressure sensitive chamber or element having two different degrees of sensitivity, motion being imparted to both pointers in separate fashion, the greater sensitivity being used to operate the pointer for low velocities (landing speeds) and the smaller sensitivity being used for the other pointer.

According to some of the characteristics of the invention, the pressure sensitive chamber has two membranes of different thicknesses, hermetically sealed on a ring which maintains their rigidity. The first link of the device used to transmit the deflection of the membranes to the pointers is mounted on said ring. When the pressure increases inside the chamber (or decreases outside), the thinner of the two membranes is deflected first, moving the ring and said transmitting link. An adjustable stop limits the relative motion of the ring (the thin membrane being taken as reference) so that when this stop is reached, the only deflection transmitted to the pointer is that of the thicker membrane— which means of course that, for the same pressure variation, the amplitude of pointer motion is considerably reduced.

According to another characteristic of the invention, the indicator has two pointers, each one of which is operated by one of the sensitive membranes. With such an arrangement, the distances between the units of the scale can be made sufficiently large throughout the range, to make for accurate and easy readings. In addition to this, the two graduations are distributed over a pair of circular scales which are concentrically arranged so that each of the pointers (they have different lengths) can cover a full dial circle, which further spreads out the graduations and thus increases the accuracy and the ease with which readings can be taken. The pointers are so arranged that, on one of their revolutions around the dial, one of them is constantly covered by the other, thus avoiding any possibility of confusion between the indications corresponding to the two series of graduations.

The detailed operation of devices embodying some of the characteristics of the invention will now be described in conjunction with the appended drawing in which.

Figure 1:
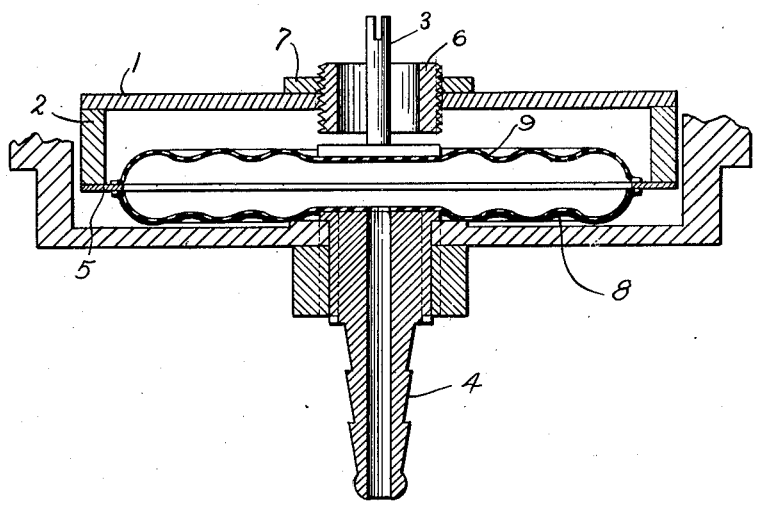
Figure 1 is a pressure sensitive chamber manufactured according to the invention.

Referring now to Figure 1 it will be noted that the pressure sensitive actuating elements are two membranes or diaphragms, a thin membrane 9 and a thick membrane 8, which are hermetically sealed at their edges to a ring 5. Supports 2, carrying a bridge 1, are attached to the ring. An adjustable stop consisting of a threaded tube 6, which can be locked in any desired position by a lock nut 7, is received in a threaded opening in the bridge 1 and makes it possible to regulate the total rise or vertical deflection of thin membrane 9 by abutment of a part thereof against stop 6. An indicator-actuating stud 3 is mounted on the diaphragm 9 and extends through the tubular stop 6 for connection with suitable indicating means. When the chamber expands, due to an increase in pressure in its interior or a pressure decrease in its casing, the thin diaphragm 9 is first deflected and, because of its relative thinness, the amount of this deflection is considerable with relation to the pressure variation. Then, portions of the thin diaphragm come into contact with stop 6, the diaphragm 9, ring 5 and bridge 1 cease to be sensitive to changes in the pressure and function as a unit actuable by the thick diaphragm 8. At this point, thick diaphragm 8 expands, the amount of its deflection being smaller than what takes place with the thin diaphragm for the same variation in pressure thus reducing the sensitivity of the device to pressure change.

Figure 2:
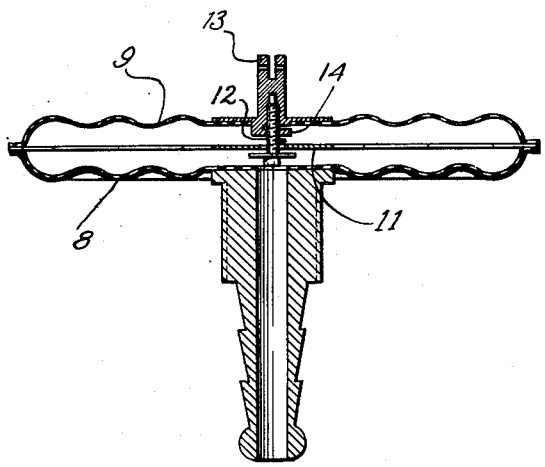
Figure 2 is another arrangement of a similar chamber.

In the modification shown in Figure 2, the sensitivity changing means is located within the pressure chamber. A ring 11, to which the margins of diaphragms 8 and 9 are hermetically sealed has an integrally formed spider that extends across the space between the diaphragms and includes a centrally located annular stop against which the headed end portion of stud 12 can abut. An indicator-actuating stud 13 is adapted to receive and hold a part of stud 12 and, being mounted upon the thin diaphragm 9, moves with it. The stud 13 is provided with a locking device such as the lug 14 which resists loosening of the stud 12 that would entail a change of the initial adjustment of the position of said stud. It will be understood that if fluid pressure is applied into the chamber defined by the two diaphragms, the thinner diaphragm will distend until the head of stud 12 engages with the stop carried by the ring 11, then further pressure will result merely in distending of the thicker diaphragm 8.

Figure 3:
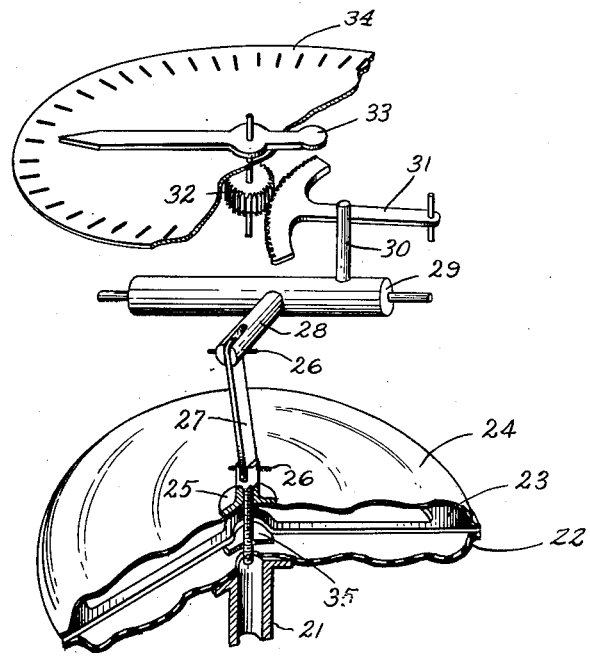
Figure 3 shows, in diagram form, an indicator made in accordance with the characteristics mentioned above.

According to the schematic diagram of Figure 3, the operation of a horizontal airspeed indicator embodying the principles of this invention is as follows: the total fluid pressure transmitted by a Pitot tube is applied through a tube 21 to the inside of the chamber defined by the diaphragms 22 and 24. This pressure acts on the diaphragms and diaphragm 24, being the thinner of the two, is deflected first, carrying with it headed-stud 35. When this stud abuts against the bridge 23, the motion or deflection of diaphragm 24 ceases and the thicker diaphragm 22 then is distended by further application of pressure. However, since its lower face rests against the casing of the instrument, parts 23, 24 and 35 rise together. These two movements are transmitted through the mechanical coupling 25, 26 and the lever 27 and, through arm 28, to shaft 29 which, in turn, causes stud 30 to rotate, moving sector 31 which actuates pinion 32 and thus moves pointer 33 relative to dial 34.

Figure 4:
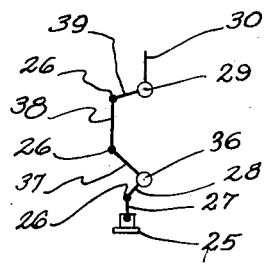
Figure 4 shows, also in diagram form, another mode of transmission of the membrane or diaphragm deflection.

In the modification shown in diagram form in Figure 4, the coupling arm 27 has been replaced by a mechanical linkage 37, 38 and 39, of adjustable length, in order to obtain a lesser motion of the pointer at the high speeds of the ship.

Figure 5:
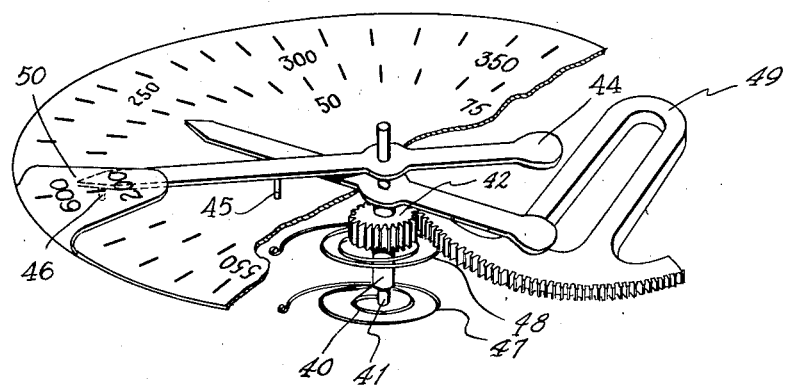
Figure 5 shows an actuating device for the pointers.

Referring now to Figure 5, in which indicating mechanism for use in conjunction with the hereinabove described pressure sensitive devices is illustrated, it will be noted that a short pointer 43 is provided which is initially actuated and sweeps the dial over the "landing speed" range, while a longer pointer 44 thereafter starts functioning when the former has completed one revolution and sweeps the dial for the "cruising speed" range.

A sleeve 40, freely rotatably mounted on a shaft 41, is connected to a hairspring 48 and carries both the pinion gear 42 and the short pointer 43. Pinion gear 42 on the sleeve 40 is normally urged by the hairspring in opposition to forces transmitted by sector arm 49. The long pointer 44, mounted on shaft 41, is normally urged by a hairspring 47 so that its end abuts against a stop 46 mounted on a mask element 50, formed of an upturned portion of the dial and overlying the end of the long pointer. Said long pointer 44 also carries a stud 45, which engages the short pointer 43 after the short pointer has completed one revolution of the dial.

In its initial position, short pointer 43 is hidden by the longer pointer. When the speed being indicated is such that the sector arm 49 is rotated, the short pointer sweeps the dial and, as it completes one revolution so that it approaches its initial position again corresponding to the point at which the end of the "landing speed" range is reached and the "cruising speed" range begins, it becomes hidden under long pointer 44 again and by engagement with the stud 45, it rotates said long pointer with itself. If the speed decreases, the long pointer is returned with the short pointer due to action of the hairspring 47 until it comes to rest against stop 46, after which the short pointer on further rotation ceases to be hidden by the long pointer and no longer engages with stud 45.

Thus, which indicates cruising speeds, the short pointer is hidden under the long pointer while, which indicates landing speeds, the end of the long pointer, in turn, is hidden, thereby minimizing possibility of confusion in the readings.

Figure 6:
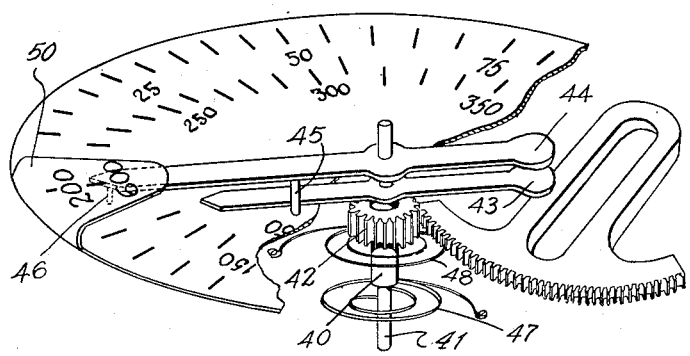
Figure 6 shows another arrangement of the pointers and dial.

Figure 6 shows a modification of the indicating device illustrated in Figure 5, in which the long pointer is used for indicating the landing speeds while the cruising speeds are shown by the short pointer. In this modification, the force exerted by the hairspring 48 is in a direction opposite to that indicated on Figure 5 and thus during the first revolution, the long pointer follows the shorter one due to the action of hairspring 47 and is then brought to rest against stop 46, the shorter pointer thus continuing its movement alone, indicating the cruising speeds with reference to the inside scale or graduation.

When the speed decreases, the short pointer reverses its rotation until it coincides with the long pointer and while underneath it engages with the stud 45. Thus, in this modification as in the other one, the possibility of confusion in the readings is minimized.

The above description of several preferred embodiments has been given as mere illustration and is not to be interpreted as being limitative in character. Some devices embodying the characteristics of the invention could well be used also for altitude indicating equipment, operation then being due, not to the application of pressure to the interior of the chamber, but to pressure acting on the outside of the casing in which the pressure sensitive chamber is housed.

We claim:

1. In a measuring instrument, a pressure chamber, a relatively thin membrane forming one wall of said chamber, a relatively thick membrane forming another wall of said chamber, an annular member secured to the rim of both membranes, a stationary support for the deflectable portion of the second membrane, a movable member in contact with the deflectable portion of the first membrane, motion limiting means rigidly secured to said annular member for controlling the deflection of the first membrane relative to said annular member, whereby a subsequent deflection of the second membrane will be communicated to said movable member, indicating means, and means for translating the displacement of said movable member into a deflection of said indicating means.

2. A measuring instrument as set forth in claim 1, wherein said motion limiting means comprises a bridge member secured to said annular member externally of the pressure chamber, and a stop adjustably secured to said bridge member.

3. A measuring instrument as set forth in claim 1, wherein said motion limiting means comprises a ring secured to said annular member internally of the pressure chamber, and a stop coacting with said ring, said stop being adjustably secured to said movable member.

4. A measuring instrument as set forth in claim 1, wherein said indicating means comprises a dial, a first pointer displaceable over said dial under the control of said movable member, a stop carried on said first pointer and a second pointer adapted to engage with said stop whereby it is caused to accompany the first pointer over part of its travel, both pointers being pivoted on the same axis.

5. A measuring instrument as set forth in claim 4, wherein the first pointer is shorter than the second pointer and lies between the latter and the dial, whereby the second pointer when engaged with the stop and accompanying the first pointer will substantially conceal the first pointer from view.

6. A measuring instrument comprising a pressure chamber, a relatively thin membrane forming one wall of said chamber, a relatively thick membrane forming another wall of said chamber, an annular member secured to the rim of both membranes, a stationary support for the deflectable portion of the second membrane, a movable member in contact with the deflectable portion of the first membrane, stop means rigidly secured to said annular member for limiting the deflection of the first membrane relative to said annular member, whereby a subsequent deflection of the second membrane will be communicated to said movable member, a dial, a first pointer, means for translating the displacement of said movable member into a deflection of said first pointer, a second pointer pivoted on the same axis as the first pointer, and means for coupling said second pointer to said first pointer after a predetermined movement of the first pointer whereby the second pointer is caused to move by and is under the control of the first pointer.

7. A measuring instrument as set forth in claim 6, wherein the second pointer has a projection adapted to engage the first pointer after the latter has substantially completed a revolution, whereby the second pointer will be entrained by the first upon further deflection of the latter.

8. A measuring instrument as set forth in claim 7, further comprising a hair spring tending to retain the second pointer in a normal position.

9. A measuring instrument as set forth in claim 8, wherein the first pointer is shorter than the second pointer and lies between the latter and the dial, whereby the second pointer when entrained by the first pointer will substantially conceal the first pointer from view.

10. A measuring instrument as set for in claim 9, further comprising means for concealing at least part of the second pointer when the latter is in the said normal position.

11. A measuring instrument as set forth in claim 6, further comprising a hair spring tending to deflect said second pointer from a normal position, the second pointer having a projection adapted to engage the first pointer whereby a deflection of the second pointer beyond the position of the first pointer will be prevented, and stationary stop means for arresting the second pointer after the latter has substantially completed a revolution.

12. A measuring instrument as set forth in claim 11, wherein the first pointer is shorter than the second pointer and lies between the latter and the dial, whereby the second pointer when accompanying the first pointer will substantially conceal the first pointer from view.

13. A measuring instrument as set forth in claim 12, further comprising means for concealing at least part of the second pointer when the latter is in the said normal position.

14. A measuring instrument as set forth in claim 6, wherein the pointers are of different length, the dial being provided with two circular sets of graduations each having a radius corresponding to the length of the associated pointer.

HENRI CASTEL.
CHARLES PICARDEL.

REFERENCES CITED

The following references are of record in the file of this patent:

UNITED STATES PATENTS

| Number | Name | Date |
|---|---|---|
| 2,185,971 | Achtel et al. | Jan. 2, 1940 |
| 2,203,460 | Fieber | June 4, 1940 |